Patented Dec. 18, 1951

UNITED STATES PATENT OFFICE 2,579,418

POLYMERIC RESINOUS PRODUCTS CONTAINING REPEATING UNITS OF SILICON LINKED TO NITROGEN AND PROCESS FOR MAKING SAME

Nicholas D. Cheronis, Chicago, Ill., assignor of one-third to Edwin L. Gustus, Chicago, Ill.

No Drawing. Application January 24, 1949, Serial No. 72,548

28 Claims. (Cl. 260—2)

This application is a continuation in part of my copending applications Serial No. 616,475, filed September 14, 1945 now abandoned, and Serial No. 56,662, filed October 26, 1948 now abandoned, which latter application in turn is a continuation in part of my application Serial No. 785,797, filed November 13, 1947 (now abandoned).

My invention relates to a new series of silicon polymers, including their preparation and use. More particularly, it relates to a series of resins and intermediates, formed by the action of organic silicon halides upon ammonia and substituted ammonias.

Silicone resins have become of interest due to certain useful and unusual properties, particularly thermal stability. Silicones are formed by the linkage through oxygen of silicon atoms, the silicon atoms having certain organic substituents thereon. A common method of preparation is by the hydrolysis of organohalosilanes.

My invention relates to the new and useful products, including resins, and their intermediates formed when organohalosilanes are allowed to react with an excess of ammonia and/or substituted ammonia either alone, or when dispersed in an inert solvent. The new and useful compounds are formed by the linkage of silicon to silicon by linkages involving nitrogen.

Thus, I postulate a new class of polymeric organosilicon compounds of the general formula in their repeating units

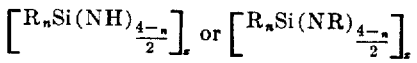

which I have named "silamines" or "aminosilanes" and which are the fully or partly polymerized ammonolysis products of halosilanes of the general formula $$R_nSiHal_{4-n}$$

wherein R is a hydrocarbon radical, and $n$ is 1 or 2.

Their formation proceeds as follows:

1. Ammonolysis

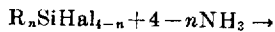

[1] A compound mhich I have not yet been able to isolate, and which possibly may not exist as a stable compound in the monomeric form.

2. Condensation

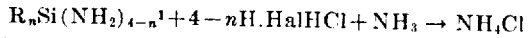

The reaction with ammonia or substituted ammonia proceeds rapidly at room temperature or lower under convenient control. The addition is rapid, convenient and flexible.

Various methods of preparing aminosilane resins in accordance with this general formula are set forth in this specification and in copending applications Serial No. 643,494, Nicholas D. Cheronis, filed January 25, 1946; Serial No. 767,331, Nicholas D. Cheronis, filed August 7, 1947 now patent Number 2,564,674; and Serial No. 767,332, Nicholas D. Cheronis, filed August 7, 1947. Reference is also made to application Serial No. 608,831, Nicholas D. Cheronis, filed August 3, 1945, now abandoned.

Important polymerization products characterized by repeating units of silicon linked to nitrogen as an integral part of the polymer chain are obtained by the condensation of the ammonolysis products of organic silicon compounds of the general formula $$R_nSiHal_{4-n}$$

where R represents a monovalent hydrocarbon radical, and $n$ represents a figure between 1 and 2. The polymerization products are assumed to have a complex structure; two suggested structures are (a) the structure derived from the condensation of a di-functional starting material

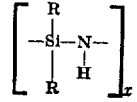

and (b) the structure derived from the condensation of a tri-functional starting material

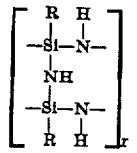

Polymerization, or strictly speaking condensation, takes place by elimination of $NH_3$ from the —$NH_2$ groups of the aminosilane monomers or intermediates. In an open-chain type aminosilane type, the ratio of Si to N is nearly 1:1, while in a fully branched polymer, the Si to N ratio approaches 1:1.5. Organosilicon diamines of the type $R_2Si(NH_2)_2$ as a rule tend to form chain type polymers, while organotriamines of the type $R.Si.(NH_2)_3$ as a rule polymerize in cross-linked patterns. Generally, the polymerization patterns corresponding to (b), above are hard and brittle, while the organosilamines corresponding to the pattern of (a), above (especially where R is a lower aliphatic radical) are oily liquids provided the molecular weight does not become too high by excessive condensation.

Condensation of the organosilamines takes place rapidly at elevated temperatures. At room temperature the methyl aminosilanes condense rapidly and the higher homologues less rapidly but nevertheless appreciably. This phenomenon is referred to by the terms "condensation" (or "polymerization"), "deamination" or "deaminative polymerization."

The repeating units of the polymerized resin consist of silicon to which are attached hydrogen-substituted or hydrocarbon-substituted nitrogen atoms as links to the adjacent repeating units; the remaining valence or valences of the silicon are taken up by a monovalent hydrocarbon radical. If a trifunctional silane, that is an organosilane having one monovalent hydrocarbon radical and three halogen atoms on the silicon atom, is selected as the starting material, the ammonolysis and subsequent condensation in accordance with the present invention will result in a cross-linked resin, in which each repeating unit consists of a silicon atom to which the monovalent hydrocarbon radical of the starting material remains attached, and which shares with the adjacent repeating units three hydrogen-substituted or hydrocarbon substituted nitrogen atoms.

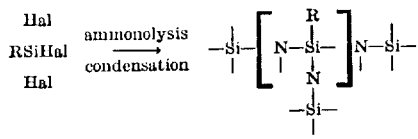

Consequently, the condensation product of an ammonolyzed tri-functional silane is characterized by a silicon to nitrogen average ratio of 1 silicon atom to approximately 1.5 nitrogen atoms in its repeating units; ammonolysis of numerous resins prepared in accordance with my invention has shown the actual existence of this ratio.

If a di-functional organosilane, that is an organosilane with two halogen atoms on the silicon atom, such as diethyldichlorosilane, is ammonolyzed and condensed in accordance with my invention by following the just-described process of reacting the organosilane in the presence of an inert solvent such as ether and in the absence of water, with an excess of liquid ammonia or primary amine wherein the amino group is the sole functional group, followed by partial condensation in solution, the resulting polymeric product is characterized by repeating unit wherein two monovalent hydrocarbon radicals are attached to the silicon atom and the remaining two valences of the silicon atom are taken up by hydrogen-substituted or hydrocarbon-substituted nitrogen links to the adjacent repeating unit.

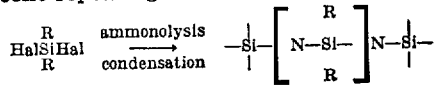

Consequently, the average silicon to nitrogen ratio in the repeating units of such a resin is 1 silicon atom to approximately 1 nitrogen atom, which fact is also proved by analysis of numerous resins prepared by me from di-functional organosilanes.

The organoaminosilane resins may be used either alone or in conjuction with other resinous water-repellent materials to treat leather. If they are used alone, the type of aminosilane resin must be selected so that when it is cured it will yield a soft flexible non-tacky resin. This can be accomplished by increasing the ratio of di-functional monomer and decreasing the ratio of the tri-functional monomer in the mixture which is to be ammonolyzed. For example, if the mixture to be ammonolyzed and condensed consists of 95% trihalosilane ($RSiCl_3$) and 5% dihalosilane ($R_2SiCl_2$), the resulting resin will have a considerable number of cross links between relatively short chains and hence will have a tendency to brittleness and granulation under dynamic conditions. On the other hand, if the mixture to be ammonolyzed and condensed consists of, say 90 to 50% tri-functional i. e. $[RSi(NH)_{1.5}]_x$, and, say 10 to 50% difunctional i. e. $(R_2SiNH)_x$, the resulting resins will have a tendency towards softness and flexibility. As the amount of the di-functional monomer is increased the ease at which the resins "cure" at room temperature by evolution of ammonia decreases. In other words, it will require heat to effect curing. However, it is clear that by controlling the ratio of the tri-functional and di-functional halosilanes of the ammonolyzed mixture, it is possible to obtain a series of resins which after curing will vary all the way from the oily type to the hard brittle type. The particular type of resin to be used depends on the ultimate use. If the leather to be treated is sole leather, a hard, tough and slightly resilient resin must be used since the flexing is at the minimum. On the other hand for glove leather, a soft, non-tacky resilient resin is required.

Stable solutions of not fully condensed organosilamines can be prepared by mixing triamino-organosilanes and diamino-organosilanes in certain proportions by dissolving them in a solvent which is inert towards such silanes. In these mixtures, the partly condensed diamino disorganosilane acts as a plasticizer for the partly condensed triaminosilane. Such solution in accordance with my invention keeps for a year or longer. After removal from storage they yield durable, flexible and non-tacky water repellent films upon application to the base, evaporation of the solvent and polymerization and curing on such base.

Thus, a principal object of my invention is the production and methods of production of resinous products as a result of the reaction of organic silicon halides with ammonia or with a primary amine wherein the amino group is the sole functional group, both as compounds and mixtures of compounds.

Another object of my invention is the production of a polymeric organo-substituted aminosilane resin having a controlled average atomic silicon to nitrogen ratio of between 1 : approximately 1.25, and 1 : approximately 1.6 in its repeating units.

Another object of my invention is to provide a stable solution of a partly polymerized organosilicon compound, which is capable of being stored for prolonged periods, and which even after such prolonged storage polymerizes to yield a durable, flexible, non-tacky and water-repellent film.

Another principal object of my invention is the provision of deamination polymerization products of ammonolyzed tri-functional organohalosilanes and of mixtures and joint deamination products of tri- and di-functional organohalosilanes, adapted for impregnating leather, textiles and other bases.

Another object of my invention is the stabilization of the solution of the intermediate polymer so as to prevent gellation.

Still another object of my invention is to produce a stable solution of the intermediate aminosilane polymer which can be emulsified after several months in storage and used for introduction into leather and textiles so as to impart water repellency and other desirable properties.

These and other objects and advantages of my invention will more fully appear in the following several examples of my invention, together with a detailed description of the same.

A typical ammonolysis and deamination reaction in accordance with my invention proceeds as follows:

EXAMPLE 1

31.4 g. of ethyltrichlorosilane diluted with 200 ml. of dry ether was added in a thin stream of 120 ml. of liquid ammonia in a Dewar flask. A vigorous reaction occurred upon contact, with the formation of ammonium chloride. The solution was allowed to stand to permit settling of the ammonium chloride, and then filtered. The residue was washed with two successive portions of 200 ml. of dry ether. The ethereal solution was vacuum distilled at room temperature without application of heat, leaving an oily sticky fluid as a residue. When a small amount of this fluid was allowed to stand in a watch glass at room temperature it became more viscous, with the evolution of ammonia. After standing half an hour, the material in the watch glass had lost its tackiness, and formed a resin. The residue from the distillation weighed 14.4 grams.

Losses in this reaction occur in the laboratory because moisture in the air reacts with the ethyltrichlorosilane to give condensed ethyltrihydroxysilane. Further, the residue from the distillation is not pure monomer, as condensation occurs at room temperature with the evolution of ammonia:

$2(C_2H_5)Si(NH_2)_3 \rightarrow$

Each end of the molecule of the dimer thus formed will react similarly; the degree of polymerization increases with time.

As prepared, the residue in the flask was soluble in toluene, and could be used for various purposes while in solution. The toluene solution in a stoppered bottle is stable over periods of at least several months. When the solution in toluene is exposed to the air, as on a sheet of glass, the toluene evaporates, ammonia is eliminated, and a dry resin results which is insoluble in organic solvents and is waterproof. No heat or ether treatment is required to cause the condensation to the insoluble resin. This auto-condensation is particularly valuable in the treatment of fabrics, etc., that might be damaged by the application of heat.

Ether as the solvent is given as an example only, as the reaction will occur in any common organic solvent which does not itself react with the organohalosilane, and which is moisture-free. A small amount of water or alcohol in the solvent used does not inhibit the reaction to the extent that it will inhibit the formation of a Grignard reagent, but merely destroys a part of the starting material before the desired reaction can occur, hence decreasing the yield, and necessitating the separation of the pure product, if the pure resin is desired. Numerous solvents are thus suitable, e. g., hexane, heptane or octane, among aliphatic compounds; and benzene, xylene and toluene, among aromatic solvents. Stoddard's solvent, a commercial colorless refined petroleum product for use in the dry-cleaning industry having a boiling point of 154.4–202.2° C., is also useful as a solvent for the aminosilanes. Ether by itself, while inert towards the aminosilanes, is not as suitable for the purpose of dissolving the organo-substituted aminosilanes (after completion of the ammonolysis) as the above-named solvents because of its volatile nature; however, in a mixture with less volatile solvents, liquid ethers of the R—O—R and R—O—R₁ type keep the aminosilanes in solution during prolonged storage. A suitable solvent mixture is, e. g., 40% ethyl or isopropyl ether to 60% hydrocarbon. Small admixtures of ketone may be used, but generally the proportion should not exceed 10 to 15% of the total solvent.

EXAMPLE 2

117 g. of ethyltrichlorosilane (technical) dissolved in 200 g. of dry xylene was added to 200 ml. of liquid ammonia in a 2-liter Erlenmeyer flask. The solution was allowed to stand 20 minutes, filtered to remove ammonium chloride, using suction, the residue washed with two successive 100 ml. portions of dry xylene, then placed under vacuum for five hours to remove the excess ammonia. A clear solution was obtained, containing 14% solids.

When a portion of the solution was allowed to dry, it condensed to a dry polymeric film. The resin formed gave an analysis of 15.5% nitrogen and 33.7% silicon.

When a portion of the solution was allowed to stand until dry and condensed, passing through the gel state, the solid resin pulverized and allowed to stand further, the nitrogen content diminished to 12.5%.

The solutions of my resin in organic solvents can be used for the treatment of fabrics, glass, leather, paper, or other material, to which it will adhere and impart water-repellant properties. When a few drops of the xylene solution of the monomer above were placed on glass, spread evenly, wiped off with tissue paper, then allowed to stand for a few hours at room temperature or a few minutes at a temperature of 60° C. the treated glass was water-repellent. Water rolled off without wetting the surface. By varying the concentration and mode of application the film thickness may be varied as desired for surface reflectance control.

A piece of paper was treated with the xylene solution by allowing drops of the solution to spread over the paper, to impregnate it. After drying at room temperature for one-half hour, the paper was found to be water-repellent. The resin thus formed also exerts a fire-retardant effect. The resin may be used not only to impregnate the paper, but as a self-setting adhesive.

My resins may also be formed from substituted ammonia compounds, as for example, a product of excellent characteristics may be obtained from n-butyl amine and ethyltrichlorosilane. A nitrogen compound must be used in which there are two active locations for the formation of the chain, and in which the other substituents do not interfere by deactivation or steric hindrance with the formation of the products. Any of the lower monoalkylamines or monoarylamines are satisfactory, as they fall within these restrictions. For example, useful products may be obtained from ammonia, ammonium carbamate, methylamine, ethyl amine, propylamine, n-butyl amine, isobutyl amine, benzylamine, naphthylamine, ethylene diamine, hexamethylene diamine, hexamethylene tetramine, phenylene diamine, propeneamine, etc. This list is indicative of certain useful nitrogen compounds only, and should in no way be taken as exclusive. Any of the nitrogen compounds containing replaceable hydrogen on the nitrogen will react to give silicon compounds, and in the absence of specific inhibiting groups, where two replaceable hydrogens are present, polymers may be formed.

The formation of the monomer occurs with monohalo-, dihalo-, and trihalo-hydrocarbon silanes, with the formation of one, two, or three amino or substituted amino groups. For chain formation, the silane should have at least two replaceable halogens. If three replaceable halogens are present, branching of the chain occurs, and cross-linkages may be formed. Accordingly, the properties of the final resin may be modified by adjusting the ratio of the proportions of the mono-, di-, and tri-hydrocarbon residues in the halosilane used. Examples of usable silanes are: methyl trichlorosilane, dimethyl dichlorosilane, ethyl trifluorosilane, ethyldichlorofluorosilane, propyl tribromosilane, butyl-tri-iodosilane benzyl trichlorosilane, naphthyl-trichlorosilane, amyl ethyldichlorosilane, propenyl trichlorosilane, diphenyldichlorosilane, etc.

Pure compounds are difficult to obtain, so that normally even though, for example, the diethylsilane is desired, a certain proportion of mono- and some triethyl silane will be present. Technical chemicals for commercial use normally contain considerable quantities of the other compounds. The average for the mixture may be two alkyl groups per silicon, but they will not be uniformly distributed. Such mixtures are satisfactory for the production of silamine resins.

When liquid ammonia is used, without any substitution on the N-atom, there are three replaceable hydrogens, so that cross-links and branch chains can be formed at the N link of the chain, which enables the use of a more highly hydrocarbon substituted silane than would otherwise be the case.

The properties of the resins formed may be modified as desired, within wide limits. The less substituted the silicon and nitrogen atoms used for chain formation, the more branch chains are formed, and accordingly more thermostable, insoluble and infusible resins may be formed. Conversely, a more thermoplastic and softer resin, with less interpolymerization may be obtained with more highly substituted chain links.

The trihalo alkyl silanes and ammonia (or an amine) give resins which are particularly useful in that they polymerize at room temperature. Diethyl dichloro silane where treated as in the examples above yields an oily, non-volatile material which will give a clear resin when heated to 160° C.

Diphenyl dichlorosilane gave a viscous oil, which changed to an opalescent resin after several days at room temperature.

The lower the degree of substitution on the silicon, the more readily the resin forms. By using mixture selected from the lists of silanes and amines, it is easy to choose reactants which give any desired readiness to polymerize.

The smaller the size of the substituents on the chain, the greater is the effect of the silicon and nitrogen in increasing thermal stability and fire-retardant qualities.

My new silicon resins may be mixed with other resins prior to polymerization, e. g., styrene resins, vinyl chloride resins, vinylidene chloride resins, cumar, coumarone-indene, modified Bakelite, Glyptals, etc. The resins may be co-polymerized, or polymerized conjointly.

The resin may be modified by the addition of such plasticizers as tricresylphosphate, castor oil, paraffin wax, or other plasticizer to the resin in various states of condensation. When so modified, and when properly diluted, the partially condensed product can be used to impregnate leather and fabrics to produce a flexible waterproof or water-repellent finish, as is shown in greater detail in my copending application Serial No. 56,663, "Resin Impregnated Water-Resistant Leather," filed October 26, 1948, which is a continuation-in-part of application Serial No. 613,009, "Water Resistant Leather," filed August 27, 1945 (now abandoned).

Accelerators to cause faster polymerization, such as benzoyl peroxide, stabilizers, particularly volatile stabilizers, may be used to modify the rate of setting as may be desired for a specific application. There is a tendency in the tri-functional amino-silanes to form films which tend to be brittle since they are fully cross linked. However, I have found that a large variety of films of widely different properties (from the very soft resins to those which are brittle) by co-ammonolysis of di-functional and tri-functional organohalosilanes or by mixing liquid di-functional ammonolyzates with liquid tri-functional ammonolyzates prior to solidifying these intermediates by further deaminative polymerization. By these methods are obtained a large variety of softness and hardness which is believed to be due to the fact that extensive cross linking is prevented.

The ratio of silicon to nitrogen in my aminosilane resins can be adjusted by properly proportioning the tri- and di-functional starting materials. As will be more fully explained, the theoretical silicon to nitrogen ratios are as follows:

*Starting compounds*

| Tri-functional | Di-functional | Si:N |
|---|---|---|
| Per cent | Per cent | |
| 0 | 100 | 1:1 |
| 20 | 80 | 1:1.1 |
| 40 | 60 | 1:1.2 |
| 60 | 40 | 1:1.3 |
| 80 | 20 | 1:1.4 |
| 100 | 0 | 1:1.5 |

These theoretical ratios can be proved experimentally by the quantitative analysis of the aminosilane resins; care must be taken that every trace of solvent is removed from the resin prior to analysis, in order to obtain accurate results.

The aminosilane resins having a Si to N ratio of the order of 1 to 1.1 to 1 to 1.25 which contain a large proportion of di-functional groups ($R_2Si.NH$) are flexible and particularly suitable for impregnation of glove leathers. The tri-functional constituent groups $$\left(R.SiNH_{\frac{3}{2}}\right)$$

in such resins serve the function of reducing the tackiness of the resin. Of course, the characteristics of the aminosilane resins vary with the hydrocarbon (R) substituents on the silicon; however, generally speaking a mixed resin whose di-functional groups predominate is more flexible than a corresponding resin in which the tri-functional groups predominate.

A mixture of partly polymerized triamino-organosilanes (RSi(NH$_2$)$_3$) and partly polymerized diorgano-substituted diamino-silanes (R$_2$Si(NH$_2$)$_2$)

in a proportion of at least 70% of the former and up to 30% of the latter will refrain from complete spontaneous polymerization for a year or more, if dissolved in a common organic solvent inert towards them. This mixture may be applied to leather, textiles or other bases from its solution, by applying the solution to the base, removing the solvent by exposure to an elevated temperature higher than room temperature and below 100° C. and/or in a vacuum, or by permitting the solvent to evaporate by exposure to the air at room temperature. The silicon intermediates remain on the base and cure thereon to form a resilient, non-tacky, water-repellent film. In the case of a fibrous base such as leather interfiber deposition takes place, whereby a high degree of water repellency and increase in strength and suppleness results. The characteristics of the film depend principally on the organic substitution groups of the silicon compound selected. With the mixture of intermediaries obtained by partial condensation of triamino-ethyl silane and diamino-diethyl silane in a proportion of over 70% of the former and less than 30% of the latter, a resilient nontacky and water-repellent film is obtained.

Numerous organic silicon triamines, i. e., compounds of the type RSi.(NH$_2$)$_3$, which if condensed and cured alone yield a comparatively hard resin, can be plasticized by an admixture of a minor proportion of a polymer of an organic silicon diamine, i. e., a compound of the type R$_2$Si(NH$_2$)$_2$. The plasticizing diamine itself should have a comparatively short carbon chain or a simple aromatic substitution group; thus, for plasticizing an aliphatic silicon triamine, particularly good results are obtained by the use of diethyl-diamino-silane in partly polymerized form, while for plasticizing an aromatic silicon triamine, diphenyl-diaminosilane in partly condensed form is suitable, particularly in the mixture ranges between 90:10 and 98:2. Generally any mixture of triamino and diamino silane may be used providing the ratio of the diamino to triamino silane is regulated in such a manner so that the film cures to a flexible non-tacky type. This may be accomplished by increasing or decreasing the diamino silane content of the mixture as the molecular weight of R in RSi(NH$_2$)$_3$ and R$_2$Si(NH$_2$) increases or decreases. Another method of doing the same is to use a diamino compound of the type R$^1$R$^2$Si(NH$_2$)$_2$ in which R$^1$ is a low molecular weight radical and R$^2$ is a high molecular weight radical. For example one may use the following mixtures for ammonolysis:

(a) 80% of C$_2$H$_5$SiCl$_3$ and 20% (C$_2$H$_5$)$_2$SiCl$_2$;
(b) 90% of C$_2$H$_5$SiCl$_3$ and 10% of (C$_2$H$_5$)$_2$SiCl$_2$;
(c) 85% C$_2$H$_5$SiCl$_3$ and 15% of (CH$_3$)$_2$SiCl$_2$;
(d) 50% C$_2$H$_5$SiCl$_3$ and 35% CH$_3$SiCl$_3$ and 15% of (C$_6$H$_5$)$_2$SiCl$_2$;
(e) 90% C$_6$H$_5$SiCl$_3$ and 10% of C$_6$H$_5$(CH$_3$)SiCl$_2$;
(f) 50% of C$_2$H$_5$SiCl$_3$, 30% n-C$_3$H$_7$SiCl$_3$, 10% (C$_6$H$_5$)$_2$SiCl$_2$ and 10% C$_6$H$_5$(CH$_3$)SiCl$_2$.

These examples show that the ratios of the resulting aminosilanes can be varied within wide limits in order to obtain desirable, resilient, stable and non-tacky films.

Generally the lower alkyl aminosilanes and more highly substituted-aryl aminosilanes cure more easily than the higher alkyl aminosilanes and less substituted-aryl aminosilane. The resulting film at room temperature depends to a large extent on the rate of curing. If for example an aminosilane cures very rapidly the tendency is to form a film of the brittle type. In such cases it is possible in accordance with my invention to remedy the situation and obtain a film which is resilient and non-tacky. This is illustrated by the case of 1-naphthyl-triamino-silane which results by the ammonolysis of 1-naphthyltrichlorosilane. Such a solution on evaporation gives off ammonia rapidly and deposits a film which has a tendency to brittleness. If to such a solution is added from 5–20% of a diaminosilane such as for example (CH$_3$)$_2$Si(NH$_2$)$_2$ or (C$_2$H$_5$)$_2$Si(NH$_2$)$_2$ or (C$_6$H$_5$)$_2$Si(NH$_2$)$_2$ or C$_6$H$_5$.Si.(NH$_2$)$_2$
CH$_3$ and the like the film deposited has no tendency to brittleness. The addition can be made either by mixing the chlorosilanes before ammonolysis, or after ammonolysis by mixing the intermediate solutions. The resulting products are not always the same; in the former case (mixing the tri- and dichlorosilanes and then ammonylizing) there is a definite possibility of cross-linkage and other types of union between the triamine and diamino compounds.

Where the film has a tendency to oiliness and tackiness, which usually occurs when the proportion of the diamino silanes is increased and the curing temperature is kept below 60° C. as is usually desirable in leather and textiles, it is possible to co-deposit with the aminosilanes elastomeric films of acrylates (partially polymerized); the residual oily character of an aminosilane film acts as plasticizer for the elastomeric acrylate film.

My stable solutions are prepared either by mixing the partly polymerized liquid diamines and triamines in the specified proportions and dissolving them in the inert solvent, or by ammonolyzing a mixture of organic tri- and di-halosilanes (among which the tri- and di-chlorosilanes are the least expensive) in an ether solution in the absence of water, expelling substantially all or part of the ether and dissolving the the ammonolyzed organo-silanes in an aliphatic or aromatic hydrocarbon solvent.

Ammonolysis of mixtures of chlorosilanes may, for instance be accomplished by reacting them with an excess of gaseous ammonia at a temperature of 10° C. or less, in accordance with copending application Serial No. 643,494; or with an excess of liquid ammonia $$\left(\begin{array}{c}\text{Si—N—Si linkage}\\\text{H}\end{array}\right)$$

or a liquid primary amine $$\left(\begin{array}{c}\text{Si—N—Si linkage}\\\text{R}\end{array}\right)$$

in accordance with Examples 1 and 2 of this specification.

The following examples illustrate the preparation of aminosilane resins whose Si to N ratio is between 1 N to more than 1 Si, and 1 N to less than 1.5 Si.

EXAMPLE 3

The liquid ammonia ammonolysis method of Example 1 of this specification is employed. 250 g. of liquid ammonia and 500 ml. of ether are placed in a 5 liter 3-neck flask, and the flask is immersed into a cooling mixture of Dry Ice and methanol so that a temperature of −35° C. to −30° C. can be kept. Through the large opening a stirrer is provided and through one of the two small openings a separator funnel is fitted for addition of the halosilane. The stirrer is started and a solution of a mixture of 151 g. of diphenyl-dichlorosilane and 85 g. of phenyltrichlorosilane dissolved in 500 ml. of dry ether were added over a period of 40 minutes. The reaction mixture was filtered and washed 3 times with 100 ml. portion of dry ether. The filtrates were concentrated at 20° C. and 10–15 mm. pressure until all the ether was removed. The oily residue of 141 g. was placed in a bottle and kept at 0° C.

A thin film of the oily residue heated at 60° C. for 12 hours or 100° C. for three hours gives off ammonia and forms a soft resilient resin. The sample cured at 60° C. on analysis gives Si=17.50% and nitrogen=10.50% or atomic ratio of Si : N=1.0 to 1.19.

It is desirable to keep this oily mixture at room temperature; a solution in dry toluene or dry xylene is made adjusting the solids to 15–20%.

EXAMPLE 4

The preparation was carried in the same apparatus. The mixture of chlorosilanes used was: 253 g. of diphenyldichlorosilane and 43 g. of phenyltrichlorosilane. The same quantities of other reagents were used as in Example 1. After distillation of the solvent (ether) at 20° C. and 12–18 mm. pressure, 144 g. oily material were obtained. This oily material when heated at 60° C. for 24 hours gives an opaque viscous tacky resin which analyzes 16.00% of silicon and 8.98% nitrogen, corresponding to an atomic ratio of Si : N=1 to 1.12.

EXAMPLE 5

A mixture of 135 g. (0.9 mol) of methyltrichlorosilane and 12.9 g. (0.1 mol) of dimethyldichlorosilane was ammonolyzed using 400 g. of liquid ammonia and 800 ml. of ether, by the method set forth in Example 1. After filtration 500 ml. of dry toluene were added and the solution concentrated under reduced pressure (20 mm. and 22° C.) until 350 g. of solution were obtained. The solution contained 14.5% solids. The film obtained at 60° C. analyzed Si—41.5% and N—29.6%, corresponding to an atomic ratio of Si : N=1 : 1.4. A hard and resilient film is obtained.

EXAMPLE 6

A mixture of 114 g. of ethyltrichlorosilane (0.7 mol) and 47 g. (0.3 mol) of diethyldichlorosilane were treated exactly as above. The yield was 305 g. of a solution containing 23% of solids. The cured film was very soft and slightly cloudy. The analysis of the cured film at 60° C. for 48 hours was: Si, 32.3%, N, 20.3%. Atomic ratio Si : N—1 : 1.26.

EXAMPLE 7

A mixture was made of a partly polymerized liquid from ethyl trichlorosilane which gave a resin having 35% of Si and 25.0% of N, and of a partly polymerized liquid ammonolyzate from diethyldichlorosilane which analyzed for resin: Si 25.9% and N 12.8%. Both solutions were adjusted to 15% solids prior to mixing, and 80 g. of tri-functional aminosilane were mixed with 20 g. of the di-functional aminosilane. The film from this mixture was not the same as that obtained from the co-ammonolysis of 0.8 mol of the same tri-functional halosilane and 0.2 mol of the di-functional halosilane, in that on curing the mixture of separately ammonolyzed and subsequently mixed resin intermediate solutions remained more oily and took a longer period of time to solidify than the co-ammonolysis product. The final film analyzed Si 33.8% and N 23.6%, or atomic ratio of Si : N=1 : 1.4.

EXAMPLE 8

The gaseous ammonolysis method according to application Serial No. 643,494, Cheronis and Gustus, was used. The halosilane mixture consisted of 126 g. (0.6 mol) of phenyltrichlorosilane and 101 g. (0.4 mol) of diphenyl dichlorosilane. A total of 1 liter of ether was used. After filtration 1000 g. of dry xylene were added and the evaporation of ether carried at 20 mm. and 25° C. The yield was 650 g. of solution containing 20.8% of solids. The film cured at 60° C. for 48 hours is soft and slightly tacky. It analyzes 18.8% of Si and 11.8% of N. Atomic ratio of Si to N=1 : 1.26.

EXAMPLE 9

Same method as Example 8. The mixture of halosilanes was: 113 g. of benzyltrichlorosilane (0.5 mol) and 141 g. of dibenzyldichlorosilane (0.5 mol). Otherwise the same quantities and method were used as in Example 8. The yield was 700 g. of a solution containing 21.3% solids. The resin obtained by curing for 48 hours at 60° C. was resilient and slightly brittle. The analysis was: Si—15.4% and N—10.2%; atomic ratio of Si to N=1 : 1.3

Numerous organic trichlorosilanes can thus be converted into the corresponding triaminosilanes and put up in stable solutions in the presence of ammonolyzed diorgano-substituted dichlorosilanes. Examples of such trichlorosilanes are:

Table 1

| | |
|---|---|
| Methyltrichlorosilane | Alyltrichlorosilane |
| Ethyltrichlorosilane | Phenyltrichlorosilane |
| n-Propyltrichlorosilane | 1-Naphthyltrichlorosilane |
| Isopropyltrichlorosilane | |
| n-Hexyltrichlorosilane | p-Tolyltrichlorosilane |
| Isoamyltrichlorosilane | p-Anisyltrichlorosilane |
| n-Butyltrichlorosilane | Cyclohexyltrichlorosilane |
| Isobutyltrichlorosilane | |
| n-Dodecyltrichlorosilane | |

Examples of dichlorosilanes which may be admixed with the trichlorosilanes enumerated in Table 1 or which can be ammonolyzed separately and then mixed with the ammonolysis products of the chlorosilanes listed in Table 1, are given in Table 2.

Table 2

| | |
|---|---|
| Dimethyldichlorosilane | Methylphenyldichlorosilane |
| Diethyldichlorosilane | |
| Di-n-propyldichlorosilane | Dibenzyldichlorosilane |
| | Diallyldichlorosilane |
| Di-iso-propyldichlorosilane | Dicyclohexyldichlorosilane |
| Diphenyldichlorosilane | Di-p-tolyldichlorosilane |

The following examples illustrate a stable solution of partly condensed aminosilane resins:

EXAMPLE 10

160 g. of a 25% xylene solution of partly polymerized triaminoethylsilane prepared by the ammonolysis of ethyltrichlorosilane in accordance with Example 1 are mixed with 40 g. of a 25% xylene solution of a partly polymerized diaminodiethylsilane prepared by the ammonolysis of diethyldichlorosilane in accordance with the same example. The solution on evaporation and curing for 24 hours at a room temperature gives a clear hard and resilient resin which on analysis contains 16.5% nitrogen and 32.5% silicon. The solution was kept in a glass stoppered airtight bottle for one year and on evaporation of the solution it gave a resin substantially of the same composition.

The solutions prepared in accordance with the foregoing example of analogous methods are applied to fibrous materials such as leather, textiles (cotton, wool, silk, nylon, etc.), wood, fur, or non-fibrous articles such as metal or glass, by direct application and evaporation of the hydrocarbon solvent. This results in the formation of a tough and flexible film. In the case of textiles, application is preferably effected by padding.

In application to leather, favorable results are obtained by first emulsifying the solution (or dispersing the solute) in water with the addition of suitable emulsifying agents such as tannery soap, lauryl sulfate, the oleyl ester of sodium tauride or of sodium methyl-tauride (now sold under the trade name of "Igepon T"), a sodium sulfonate of a higher aliphatic-aromatic alcohol (now sold under the trade name of "Nacconal") carried out in a celloid mill. I have found that the resiliency of the film formed on the leather is further improved by adding to the aminosilane solution or emulsion prior to its application to leather up to 20%, preferably 5-7%, of a suitable plasticizer, such as a phthalate, tricresyl phosphate, castor oil, or paraffin oil. The impregnated leather is non-tacky, extremely pliable, and possesses water repellency over a prolonged period of time. It is particularly suitable for gloves and shoe uppers, as it does not crack even upon frequent flexing over prolonged periods.

EXAMPLE 11

A horsehide weighing 860 g. previously chrome-tanned, fat-liquored and dyed so that the amount of fat in the skin was 16% was dried by heating in an oven at 60° C. until its moisture content was about 2%. It was then immersed for about 1 minute in a xylene solution prepared by mixing 800 g. of a solution prepared in accordance with Example 10 and 500 g. of dry xylene. A small amount of ammonia was given off due to the hydrolysis of the aminosilane by the moisture present in the fibers. The skin after dipping in the xylene solution was drained, then the solvent was allowed to evaporate at room temperature for 2 hours. It was heated for 2 hours at 60° C. and then staked and finished as usual. The weight of the skin was 1008 g. The leather exhibited no tackiness, had good physical characteristics and a high degree of water repellency.

Fluoro-, bromo- and iodo-substituted organosilanes may be substituted for the chlorosilanes mentioned in the foregoing examples as suitable for hydrolysis and ammonolysis.

By the term "partly condensed" or "partly polymerized" aminosilane, I denote a liquid intermediate resin of the type

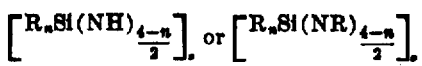

which is soluble in an inert solvent, and wherein $n$ is 1 or 2 and $x$ does not exceed about 60; the intermediate resin chains being cyclic or terminated by amino (e. g. $NH_2$) groups. Molecular weights of course vary according to the composition of organic radical or radical R; the higher the molecular weight of the condensation product, the greater generally becomes its viscosity. Consequently, a mixture whose average molecular weight is too high becomes unsuitable for the impregnation of fibrous substances, e. g. leather, as excessive viscosity prevents penetration between the fibers of the base and causes a pasty and sticky resin deposition on the surface of the base.

It will also be understood that the terms "polymerization" and "condensation" and the terms "polymerize" and "condense" are used synonymously throughout the specification and claims.

For some special applications, especially where an extremely hard, glassy resin is desired, it is possible to raise the Si to N ratio of the repeating units of the aminosilane resin to 1 : above 1.5 by adding to the tri-functional organosilane starting material a predetermined amount of silicon tetrahalide, usually silicon tetrachloride, followed by ammonolysis with an excess of ammonia or primary amine and by deaminative polymerization, as set out in preceding examples. The theoretical maximum Si to N ratio in a fully branched polymer of the ammonolysis product of silicon tetrahalide is 1:2 in its repeating units, inasmuch as all four valences of the silicon atom are satisfied by substituted nitrogen, and each of these nitrogen atoms forms a bond between (or is "shared" by) two silicon atoms.

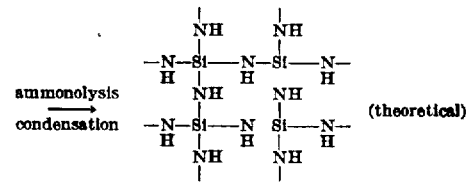

Consequently, the deaminative polymerization product of a mixture of ammonolyzates of a trihaloorganosilane and tetrahalosilane will have a Si to N ratio of 1 to more than 1.5, but 1 to less than 2. The optimum Si to N ratio will depend on the individual desired end use for the resin, and on the type of organic substituent of the trihaloorganosilane.

EXAMPLE 12

A mixture of 73.5 g. of ethyltrichlorosilane (0.45 mol) and 8.5 g. of silicon tetrachloride (0.05 mol) was dissolved in 100 ml. of dry ether and added very slowly in a mixture of 100 g. of liquid ammonia and 200 ml. of ether. The reaction was very vigorous and it became necessary to add more liquid ammonia and ether as the reaction proceeded since there was considerable loss of both due to the vigor of the reaction. Therefore a total of 200 g. of liquid ammonia was used and a total of 400 ml. of ether. After the complete addition of the mixture of halides the reaction mixture was filtered and the solid washed three times with dry ether. The residue in the filter funnel was then dissolved in water and the insoluble resin filtered at one. The amount of the latter when air dried was 3.46 g. The ethereal filtrates were concentrated to about 100 ml. and then 160 ml. of toluene was added and then the ether was distilled off at room temperature and 20–30 mm. pressure. The yield was 135 g. of a solution containing 22% solids. The resin obtained by evaporation of the solution in thickness of 2–3 mm. at 60° C. and 100° C. had the same characteristics as the resin obtained from pure ethyltrichlorosilane except that it was more brittle and not as resilient. The resin was cured at 60° C. and analyzed for silicon and nitrogen; it was found to contain 30.7% of silicon and 23.8% of nitrogen, corresponding to a ratio of 1 atom of silicon to 1.55 atoms of nitrogen.

EXAMPLE 13

29 g. of ethyltrichlorosilane (0.175 mol) and 13 g. of silicon tetrachloride (0.075 mol), or a total of 0.25 mol of the mixture were dissolved in 50 ml. of ether and then added slowly to the mixture of 150 ml. of liquid ammonia and 300 ml. of ether. The reaction product was filtered and washed; 4.5 g. of insoluble resin were thus separated. The ethereal filtrate was then treated by evaporation of the ether and addition of toluene, and a yield of 82 g. of a solution containing 15.1% by weight of solids was obtained. Upon evaportion at 60° C. of the solvent from the last-mentioned solution, a clear resin was obtained which was brittle and very adhering to glass. Analysis for nitrogen and silicon established a ratio of 1 atom of Si to 1.6 atoms of N. This analytical ratio nearly corresponds to the theoretical Si to N ratio of 1:1.65 to be expected from the ammonolysis and deaminative polymerization of a mixture of 0.175 mol of organotrihalosilane and 0.75 mol of silicon tetrahalide; the difference between analytical and theoretical ratio is believed due to the "insoluble resin" which refuses to go into solution with ether and toluene.

The "insoluble resin" mentioned in Examples 12 and 13, which refuses to go into solution with ether and toluene forms locally as the result of local overheating during the exothermic ammonolysis reaction; it has no practical application, as far as I am aware. On the other hand, the organosilicon resin which goes into solution and is obtained therefrom by evaporation of the inert solvent from the solution is suitable for coating various solid objects; such as glass, wood, leather, etc., e. g. by application of the solution to the base, elimination of the solvent at an elevated temperature and/or a vacuum, followed by curing of the resin (which has a silicon-nitrogen ratio of 1 to greater than 1.5 in its repeating units), and thus falls within the purview of my invention.

Having thus fully described my invention of polymeric resinous products containing organo-substituted repeating units of silicon linked to nitrogen, together with various methods of production and application of the same, I desire to claim my invention broadly and to limit its scope only by the appended claims.

I claim:

1. The process which comprises reacting a monovalent-hydrocarbon-substituted halosilane starting material of the average formula

wherein R is a monovalent hydrocarbon radical, Hal is a halogen atom, and $n$ is a number from about 1 to about 1.5, said starting material containing at least 50 mol per cent of a compound of the general formula

wherein R is a monovalent hydrocarbon radical and Hal is a halogen atom, with a compound selected from the class consisting of liquid ammonia and primary amine wherein the amino group is the sole functional group, said last-named compound being present in the reaction in an amount in excess of that required to replace all the halogen attached to the silicon of said starting material, in the presence of an inert solvent and in the absence of water, to produce a solution of a polymeric substance characterized by repeating units of silicon linked to nitrogen as an integral part of the polymer chain.

2. The process which comprises reacting a monovalent-hydrocarbon-substituted halosilane starting material of the average formula

wherein R is a monovalent hydrocarbon radical, Hal is a halogen atom, and $n$ is a number from about 1 to about 1.5, said starting material containing at least 50 mol per cent of a compound of the general formula

wherein R is a monovalent hydrocarbon and Hal is a halogen atom, with a compound selected from the class consisting of liquid ammonia and primary amine wherein the amino group is the sole functional group, said last-named compound being present in the reaction in an amount in excess of that required to replace all the halogen attached to the silicon of said starting material, in the presence of an inert solvent and in the absence of water, to produce a solution of a polymeric substance, and removing said solvent to produce a resin characterized by repeating units of silicon linked to nitrogen as an integral part of the polymer chain.

3. The process which comprises reacting a monovalent - hydrocarbon-substituted chlorosilane starting material of the average formula

wherein R is a monovalent hydrocarbon radical and $n$ is a number from about 1 to about 1.5, said starting material containing at least 50 mol per cent of a compound of the general formula

wherein R is a monovalent hydrocarbon radical with a compound selected from the class consisting of liquid ammonia and primary amine wherein the amino group is the sole functional group, said last-named compound being present in the reaction in an amount in excess of that required to replace all the chlorine attached to the silicon of said starting material, in the presence of an inert solvent and in the absence of water, to produce a solution of a polymeric substance characterized by repeating units of silicon linked to nitrogen as an integral part of the polymer chain.

4. The process which comprises reacting a monovalent-hydrocarbon - substituted chlorosilane starting material of the average formula

wherein R is a monovalent hydrocarbon radical and $n$ is a number from about 1 to about 1.5, said starting material containing at least 50 mol per cent of the compound of the general formula RSiCl₃ wherein R is a monovalent hydrocarbon radical with a compound selected from the class consisting of liquid ammonia and primary amine wherein the amino group is the sole functional group, said last-named compound being present in the reaction in an amount in excess of that required to replace all the chlorine attached to the silicon of said starting material, in the presence of an inert solvent and in the absence of water, to produce a solution of a polymeric substance, and removing said solvent to produce a resin characterized by repeating units of silicon linked to nitrogen as an integral part of the polymer chain.

5. The process which comprises reacting a monovalent-hydrocarbon-substituted halosilane starting material of the average formula R_nSiHal_{(4−n)} wherein R is a monovalent hydrocarbon radical, Hal is a halogen atom, and n is a number from about 1 to about 1.5, said starting material containing at least 50 mol per cent of a compound of the general formula RSiHal₃ wherein R is an alkyl radical and Hal is a halogen atom, with a compound selected from the class consisting of liquid ammonia and primary amine wherein the amino group is the sole functional group, said last-named compound being present in the reaction in an amount in excess of that required to replace all the halogen attached to the silicon of said starting material, in the presence of an inert solvent and in the absence of water, to produce a solution of a polymeric substance characterized by repeating units of silicon linked to nitrogen as an integral part of the polymer chain.

6. The process which comprises reacting a monovalent-hydrocarbon-substituted halosilane starting material of the average formula R_nSiHal_{(4−n)} wherein R is a monovalent hydrocarbon radical, Hal is a halogen atom, and n is a number from about 1 to about 1.5, said starting material containing at least 50 mol per cent of a compound of the general formula RSiHal₃ wherein R is an alkyl radical and Hal is a halogen atom, with a compound selected from the class consisting of liquid ammonia and primary amine wherein the amino group is the sole functional group, said last-named compound being present in the reaction in an amount in excess of that required to replace all the halogen attached to the silicon of said starting material, in the presence of an inert solvent and in the absence of water, to produce a solution of a polymeric substance, and removing said solvent to produce a resin characterized by repeating units of silicon linked to nitrogen as an integral part of the polymer chain.

7. The process which comprises dissolving in a water-free, inert solvent: (1) a liquid polymeric substance soluble in said solvent and capable of further polymerization, said substance being characterized by repeating units of silicon linked to nitrogen as an integral part of the polymer chain in which the repeating units consist of silicon substituted by monovalent hydrocarbon radicals, said silicon being attached to nitrogen substituted by a member of the group consisting of hydrogen and hydrocarbon radicals, and having an average ratio of 1 atom of silicon to approximately 1.5 atoms of nitrogen in its repeating units, and (2) a liquid polymeric substance soluble in said solvent and capable of further polymerization, said substance being characterized by repeating units of silicon linked to nitrogen as an integral part of the polymer chain in which the repeating units consist of silicon substituted by monovalent hydrocarbon radicals, said silicon being attached to nitrogen substituted by a member of the group consisting of hydrogen and hydrocarbon radicals, and having an average ratio of 1 atom of silicon to approximately 1 atom of nitrogen in its repeating units said first-named liquid polymeric substance being present in a molar ratio at least equal to that of said second-named liquid polymeric substance, and removing said solvent to produce a resin characterized by repeating units of silicon linked to nitrogen as an integral part of the polymer chain.

8. The process which comprises reacting in the absence of water a compound of the general formula R₂SiHal₂ wherein R is a monovalent hydrocarbon radical and Hal is a halogen atom, and a compound of the general formula RSiHal₃, wherein R is a monovalent hydrocarbon radical and Hal is a halogen atom, the molar proportion of said RSiHal₃ compound being at least equal to that of said R₂SiHal₂ compound, with a compound selected from the class consisting of liquid ammonia and liquid primary amine wherein the amino group is the sole functional group, said third-named compound being present in the reaction in an amount in excess of that required to replace all the halogen attached to the silicon of the first-named and second-named compounds, and dissolving the silicon-containing reaction products in an inert water-free solvent and in the absence of water, to produce a solution of a polymeric substance characterized by repeating units of silicon linked to nitrogen as an integral part of the polymer chain.

9. A method for preparing a stable solution of hydrocarbon-substituted silicon amine polymers, comprising reacting in the absence of water between 70 and 98 parts of a compound of the general formula RSiHal₃ wherein R is a monovalent hydrocarbon radical and Hal is a halogen atom, and between 30 and 2 parts of a compound of the general formula R₂SiHal₂ wherein R is a monovalent hydrocarbon radical and Hal is a halogen atom, with a compound selected from the class consisting of ammonia and primary amine wherein the amino group is the sole functional group, said third-named compound being present in the reaction in an amount in excess of that required to replace all the halogen attached to the silicon of the first-named and second-named compounds and dissolving the silicon-containing reaction product in an inert solvent and in the absence of water, to produce a stable solution of a polymeric substance characterized by repeating units of silicon linked to nitrogen as an integral part of the polymer chain.

10. A polymeric resin characterized by repeating units of silicon linked to nitrogen as an integral part of the polymer chain and having repeating units consisting of silicon substituted by monovalent hydrocarbon radicals, said silicon being attached to nitrogen substituted by a member consisting of hydrogen and hydrocarbon radicals, said resin having an average ratio of 1 atom of silicon to between approximately 1.25 and approximately 1.6 atoms of nitrogen in its repeating units.

11. A polymeric resin characterized by repeating units of silicon linked to nitrogen as an integral part of the polymer chain in which the repeating units consist of silicon substituted by from one to two monovalent hydrocarbon radicals, said silicon being attached to nitrogen substituted by a member of the group consisting of hydrogen and hydrocarbon radicals, at least half of said repeating units having only one said monovalent hydrocarbon radical substituent per silicon atom.

12. A polymeric resin characterized by repeating units of silicon linked to nitrogen as an integral part of the polymer chain in which the repeating units consist of silicon substituted by monovalent hydrocarbon radicals, said silicon being attached to nitrogen substituted by a member of the group consisting of hydrogen and hydrocarbon radicals, said resin having an average ratio of 1 atom of silicon to approximately 1.5 atoms of nitrogen in its repeating units.

13. A polymeric resin characterized by repeating units of silicon linked to nitrogen as an integral part of the polymer chain in which the repeating units consist of silicon substituted by from one to two monovalent hydrocarbon radicals, said silicon being attached to nitrogen substituted by hydrogen, at least half of said repeating units being substituted by only one of said monovalent hydrocarbon radicals per silicon atom.

14. A polymeric resin characterized by repeating units of silicon linked to nitrogen as an integral part of the polymer chain in which the repeating units consist of silicon substituted by from one to two ethyl radicals, said silicon being attached to nitrogen substituted by a member of the group consisting of hydrogen and hydrocarbon radicals, at least half of said repeating units having only one said ethyl radical substituent per silicon atom.

15. A polymeric resin characterized by repeating units of silicon linked to nitrogen as an integral part of the polymer chain in which the repeating units consist of silicon substituted by from one to two alkyl radicals, said silicon being attached to nitrogen substituted by a member of the group consisting of hydrogen and hydrocarbon radicals, at least half of said repeating units having only one said alkyl radical substituent per silicon atom.

16. A polymeric resin characterized by repeating units of silicon linked to nitrogen as an integral part of the polymer chain in which the repeating units consist of silicon substituted by ethyl radicals, said silicon being attached to nitrogen substituted by hydrogen, said resin having an average ratio of 1 atom of silicon to approximately 1.5 atoms of nitrogen in its repeating units.

17. A solution comprising, in an inert water-free solvent: polymeric substances characterized by repeating units of silicon linked to nitrogen as an integral part of the polymer chain in which the repeating units consist of silicon substituted by from one to two monovalent hydrocarbon radicals, said silicon being attached to nitrogen substituted by a member of the group consisting of hydrogen and hydrocarbon radicals, at least half of said repeating units having only one said monovalent hydrocarbon substituent per silicon atom.

18. A stable solution comprising, in an inert water-free solvent: (1) a polymeric substance characterized by repeating units of silicon linked to nitrogen as an integral part of the polymer chain in which the repeating units consist of silicon substituted by monovalent hydrocarbon radicals, said silicon being attached to nitrogen substituted by a member of the group consisting of hydrogen and hydrocarbon radicals, and having an average ratio of 1 atom of silicon to approximately 1.5 atoms of nitrogen in its repeating units, and (2) a polymeric substance characterized by repeating units of silicon linked to nitrogen as an integral part of the polymer chain in which the repeating units consist of silicon substituted by monovalent hydrocarbon radicals, said silicon being attached to nitrogen substituted by a member of the group consisting of hydrogen and hydrocarbon radicals, and having an average ratio of 1 atom of silicon to approximately 1 atom of nitrogen in its repeating units; said first-named polymeric substance being present in said solution in an amount of between 70% and 98% based on the weight of solutes, and said second-named substance being present in said solution in an amount of between 30% and 2% based on the weight of solutes.

19. A stable solution comprising, in an inert water-free solvent: (1) a polymeric substance characterized by repeating units of silicon linked to nitrogen as an integral part of the polymer chain in which the repeating units consist of silicon substituted by monovalent alkyl radicals, said silicon being attached to nitrogen substituted by a member of the group consisting of hydrogen and hydrocarbon radicals, and having an average ratio of 1 atom of silicon to approximately 1.5 atoms of nitrogen in its repeating units, and (2) a polymeric substance characterized by repeating units of silicon linked to nitrogen as an integral part of the polymer chain in which the repeating units consist of silicon substituted by monovalent alkyl radicals, said silicon being attached to nitrogen substituted by a member of the group consisting of hydrogen and hydrocarbon radicals, and having an average ratio of 1 atom of silicon to approximately 1 atom of nitrogen in its repeating units; said first-named polymeric substance being present in said solution in an amount of between 70% and 98% based on the weight of solutes, and said second-named substance being present in said solution in an amount of between 30% and 2% based on the weight of solutes.

20. A stable solution comprising, in an inert water-free solvent: (1) polymeric substance characterized by repeating units of silicon linked to nitrogen as an integral part of the polymer chain in which the repeating units consist of silicon substituted by ethyl radicals, said silicon being attached to nitrogen substituted by a member of the group consisting of hydrogen and hydrocarbon radicals, and having an average ratio of 1 atom of silicon to approximately 1.5 atoms of nitrogen in its repeating units, and (2) a polymeric substance characterized by repeating units of silicon linked to nitrogen as an integral part of the polymer chain in which the repeating units consist of silicon substituted by ethyl radicals, said silicon being attached to nitrogen substituted by a member of the group consisting of hydrogen and hydrocarbon radicals, and having an average ratio of 1 atom of silicon to approximately 1 atom of nitrogen in its repeating units; said first-named polymeric substance being present in said solution in an amount of between 70% and 98% based on the weight of solutes, and said second-named substance being present in said solution in an amount of between 30% and 2% based on the weight of solutes.

21. A stable solution comprising, in an inert water-free solvent: (1) a polymeric substance characterized by repeating units of silicon linked to nitrogen as an integral part of the polymer chain in which the repeating units consist of silicon substituted by monovalent alkyl radicals, said silicon being attached to nitrogen substituted by a member of the group consisting of hydrogen and hydrocarbon radicals, and having an average ratio of 1 atom of silicon to approximately 1.5 atoms of nitrogen in its repeating units, and (2) a polymeric substance characterized by repeating units of silicon linked to nitrogen as an integral part of the polymer chain in which the repeating units consist of silicon substituted by monovalent aryl hydrocarbon radicals, said silicon being attached to nitrogen substituted by a member of the group consisting of hydrogen and hydrocarbon radicals, and having an average ratio of 1 atom of silicon to approximately 1 atom of nitrogen in its repeating units; said first-named polymeric substance being present in said solution in an amount of between 70% and 98% of the weight of solutes, and said second-named substance being present in said solution in an amount of between 30% and 2% based on the weight of solutes.

22. The process which comprises reacting in the absence of water a compound of the general formula

RSiHal₂ wherein R is a monovalent hydrocarbon radical and Hal is a halogen atom, with a silicon tetrahalide compound and with a compound selected from the class consisting of liquid ammonia and liquid primary amine wherein the amino group is the sole functional group, said third-named compound being present in the reaction in an amount in excess of that required to replace all the halogen attached to the silicon of the first-named and second-named compounds, dissolving the silicon-containing reaction products in an inert water-free solvent and in the absence of water, to produce a solution of a polymeric substance, and removing said solvent to produce a resin characterized by repeating units of silicon linked to nitrogen as an integral part of the polymer chain.

23. A stable solution comprising, in an inert water-free solvent: (1) a polymeric substance characterized by repeating units of silicon linked to nitrogen as an integral part of the polymer chain in which the repeating units consist of silicon substituted by monovalent aryl radicals, said silicon being attached to nitrogen substituted by a member of the group consisting of hydrogen and hydrocarbon radicals, and having an average ratio of 1 atom of silicon to approximately 1.5 atoms of nitrogen in its repeating units, and (2) a polymeric substance characterized by repeating units of silicon linked to nitrogen as an integral part of the polymer chain in which the repeating units consist of silicon substituted by monovalent aryl radicals, said silicon being attached to nitrogen substituted by a member of the group consisting of hydrogen and hydrocarbon radicals, and having an average ratio of 1 atom of silicon to approximately 1 atom of nitrogen in its repeating units; said first-named polymeric substance being present in said solution in an amount of between 70% and 98% based on the weight of solutes, and said second-named substance being present in said solution in an amount of between 30% and 2% based on the weight of solutes.

24. A stable solution comprising, in an inert water-free solvent: (1) a polymeric substance characterized by repeating units of silicon linked to nitrogen as an integral part of the polymer chain in which the repeating units consist of silicon substituted by phenyl radicals, said silicon being attached to nitrogen substituted by a member of the group consisting of hydrogen and hydrocarbon radicals, and having an average ratio of 1 atom of silicon to approximately 1.5 atoms of nitrogen in its repeating units, and (2) a polymeric substance characterized by repeating units of silicon linked to nitrogen as an integral part of the polymer chain in which the repeating units consist of silicon substituted by phenyl radicals, said silicon being attached to nitrogen substituted by a member of the group consisting of hydrogen and hydrocarbon radicals, and having an average ratio of 1 atom of silicon to approximately 1 atom of nitrogen in its repeating units; said first-named polymeric substance being present in said solution in an amount of between 70% and 98% based on the weight of solutes, and said second-named substance being present in said solution in an amount of between 30% and 2% based on the weight of solutes.

25. A polymeric resin characterized by repeating units of silicon linked to nitrogen as an integral part of the polymer chain in which the repeating units consist of silicon substituted by from one to two aryl radicals, said silicon being attached to nitrogen subtsituted by a member of the group consisting of hydrogen and hydrocarbon radicals, at least half of said repeating units being substituted by only one of said aryl radicals per silicon atom.

26. A polymeric resin characterized by repeating units of silicon linked to nitrogen as an integral part of the polymer chain in which the repeating units consist of silicon substituted by from one to two phenyl radicals, said silicon being attached to nitrogen substituted by a member of the group consisting of hydrogen and hydrocarbon radicals, at least half of said repeating units having only one said phenyl radical substituent per silicon atom.

27. The process according to claim 1, wherein R is ethyl.

28. The process according to claim 3, wherein R is ethyl.

NICHOLAS D. CHERONIS.

REFERENCES CITED

The following references are of record in the file of this patent:

UNITED STATES PATENTS

| Number | Name | Date |
|---|---|---|
| 2,462,635 | Haber | Feb. 22, 1949 |

OTHER REFERENCES

Sauer: Journ. Amer. Chem. Soc., vol. 66, 1944 p. 1708.

Certificate of Correction

Patent No. 2,579,418                                                      December 18, 1951

NICHOLAS D. CHERONIS

It is hereby certified that error appears in the printed specification of the above numbered patent requiring correction as follows:

Column 5, line 51, for "ether" read *other*; column 6, line 11, before "ketone" insert *a*;

and that the said Letters Patent should be read as corrected above, so that the same may conform to the record of the case in the Patent Office.

Signed and sealed this 1st day of April, A. D. 1952.

[SEAL]

THOMAS F. MURPHY,
*Assistant Commissioner of Patents.*

Certificate of Correction

Patent No. 2,579,418 December 18, 1951

NICHOLAS D. CHERONIS

It is hereby certified that error appears in the printed specification of the above numbered patent requiring correction as follows:

Column 5, line 51, for "ether" read *other*; column 6, line 11, before "ketone" insert *a*;

and that the said Letters Patent should be read as corrected above, so that the same may conform to the record of the case in the Patent Office.

Signed and sealed this 1st day of April, A. D. 1952.

[SEAL]

THOMAS F. MURPHY,
*Assistant Commissioner of Patents.*